United States Patent …

(12) United States Patent
Thompson

(10) Patent No.: US 8,973,878 B2
(45) Date of Patent: Mar. 10, 2015

(54) SURFACE MOUNT SYSTEMS AND METHODS

(75) Inventor: Craig Thompson, Inver Grove Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1460 days.

(21) Appl. No.: 12/056,384

(22) Filed: Mar. 27, 2008

(65) Prior Publication Data

US 2009/0242712 A1  Oct. 1, 2009

(51) Int. Cl.
*A47B 96/00* (2006.01)
*F16M 13/02* (2006.01)
*A47G 1/17* (2006.01)
*A47K 10/10* (2006.01)

(52) U.S. Cl.
CPC .............. *F16M 13/02* (2013.01); *A47G 1/175* (2013.01); *A47K 10/10* (2013.01); *A47K 2201/02* (2013.01)
USPC ............ 248/221.11; 248/222.13; 248/223.31; 248/683; 403/348

(58) Field of Classification Search
USPC ............ 248/201, 220.1, 223.41, 225.11, 200, 248/221.11, 222.13, 224.7, 225.21, 223.31, 248/683, 205.3; 403/348, 350
See application file for complete search history.

(56) References Cited

U.S. PATENT DOCUMENTS

| | | | |
|---|---|---|---|
| 1,915,479 A * | 6/1933 | Smith | 248/222.14 |
| 1,940,888 A * | 12/1933 | Smith | 248/222.14 |
| 2,144,602 A * | 1/1939 | Balmer | 248/250 |
| 2,506,602 A * | 5/1950 | Laystrom et al. | 108/152 |
| 2,864,578 A * | 12/1958 | Margulis | 248/221.11 |
| 3,482,809 A * | 12/1969 | McCall, Jr. | 248/205.1 |
| 3,794,181 A * | 2/1974 | Canham | 211/65 |
| 4,024,312 A | 5/1977 | Korpman | |
| 4,566,662 A * | 1/1986 | Toshishige | 248/222.14 |
| 4,662,593 A * | 5/1987 | Shames et al. | 248/222.14 |
| 4,979,713 A * | 12/1990 | Bell | 248/224.8 |
| 5,507,464 A * | 4/1996 | Hamerski et al. | 248/683 |
| 5,516,581 A | 5/1996 | Kreckel et al. | |
| 5,603,475 A * | 2/1997 | Lim | 248/222.14 |
| 5,984,247 A * | 11/1999 | Luhmann et al. | 248/205.3 |
| 6,001,471 A * | 12/1999 | Bries et al. | 428/343 |
| 6,004,642 A * | 12/1999 | Langford | 428/40.1 |
| 6,106,937 A * | 8/2000 | Hamerski | 428/343 |
| 6,162,534 A * | 12/2000 | Hamerski | 428/354 |
| 6,199,808 B1 | 3/2001 | Lin | |
| 6,245,177 B1 * | 6/2001 | Luhmann | 156/182 |
| 6,520,463 B1 | 2/2003 | Ouano | |

(Continued)

FOREIGN PATENT DOCUMENTS

KR  20-1996-027427 U  8/1996
KR  10-0431497 B1  5/2004

(Continued)

OTHER PUBLICATIONS

PCT International Search Report PCT/ISA/210.

*Primary Examiner* — Kimberly Wood
(74) *Attorney, Agent, or Firm* — Kenneth B. Wood

(57) ABSTRACT

Herein are disclosed systems and methods and assemblies for mounting an accessory base to a surface (e.g., a wall surface). The systems comprise a mounting bracket which can be attached to the surface by a double-faced adhesive such as a stretch-releasing adhesive. The accessory base can be attached to the mounting bracket.

20 Claims, 7 Drawing Sheets

(56) References Cited

U.S. PATENT DOCUMENTS

2007/0102601 A1    5/2007    Thompson
2008/0048079 A1    2/2008    Albritton et al.

FOREIGN PATENT DOCUMENTS

KR      20-0410339 Y1    3/2006
WO    WO 2007/013035 A1    2/2007

* cited by examiner

SURFACE MOUNT SYSTEMS AND METHODS

BACKGROUND

Wall mounted accessories are widely used in a variety of applications. For example, bathroom walls often have towel bars and rings, robe hooks, and the like mounted upon them. Other accessories that are often wall-mounted include shelves, speaker brackets, and the like.

Wall mounted accessories are often mounted to a wall by the attachment of a mounting bracket to the wall and the attachment of the accessory to the bracket. Methods used to attach the bracket to the wall often involve the use of a screw or a nail. Thus, upon removal of the accessory and bracket, damage to the wall is often visible. Also, occasionally, a portion of the accessory may contact the wall and cause damage by scuffing, gouging, or abrading the wall, again with the result that, upon removal of the accessory and bracket, damage to the wall is visible.

Adhesives (e.g., pressure-sensitive adhesives) have found use in attaching and/or assembling items. For example, double-sided adhesive tapes (i.e., tapes bearing adhesive on both major opposing surfaces) are also widely known and used. In particular, stretch releasing adhesive tapes have found use in a wide variety of assembling, joining, attaching, and mounting applications.

SUMMARY

Herein are disclosed systems and methods for the attachment of an item to a wall by double faced adhesive. The systems use a mounting bracket which comprises at least one angled retaining flange and also comprises at least a first major surface to which one surface of a double-faced adhesive sheet can be attached. The other surface of the double-faced adhesive sheet can be attached to a wall thus resulting in secure attachment of the mounting bracket to the wall. If the double-faced adhesive is a stretch-release adhesive, the above process results in the mounting bracket being securely, yet removably, attached to the wall. Specifically, the mounting bracket can be removed from the wall (by the procedure of stretching the adhesive to activate the stretch release property) with minimal or no damage to the wall.

The systems further comprise an accessory base which can be removably mounted to the mounting bracket. The accessory base comprises an open-ended cavity which is adapted to receive the mounting bracket. The accessory base comprises an interior surface, which is the portion of the surface of the accessory base that is within the cavity. The accessory base also comprises a perimeter, and a perimeter surface (that comprises the surface of the accessory base that is in closest proximity to the wall surface when the accessory is mounted to the wall) that defines an imaginary plane that extends across the open end of the cavity.

The accessory base further comprises an engaging member that is adapted to engage with the angled retaining flange of the mounting bracket so as to secure the accessory base and the mounting bracket together. The mounting bracket and the accessory base are configured such that, when the engaging member is engaged with the angled retaining flange, the accessory base and the mounting bracket are moved toward each other until at least a portion of the mounting bracket contacts at least a portion of the interior surface of the accessory base within the open-ended cavity, such that no further relative movement of the accessory base and the mounting bracket toward each other is possible and the mounting bracket and accessory base are in a secured condition.

The mounting bracket and accessory base are further configured such that, when the accessory base and the mounting bracket are secured to each other, the first major surface of the mounting bracket is positioned within a specific location with respect to the imaginary plane defined by the perimeter surface. In one embodiment, the system is configured such that, when in a secured condition, the first major surface of the mounting bracket is located at a position that is recessed inwards (toward the interior surface of the accessory base) relative to the imaginary plane. In a further embodiment, the system is configured such that, when in a secured condition, the first major surface of the mounting bracket is recessed inwards relative to the imaginary plane, a distance less than the thickness of the double-faced adhesive sheet that is used to attach the mounting bracket to the wall.

A potential advantageous effect of at least one embodiment disclosed herein is that, when the accessory base is mounted to the wall by use of the mounting bracket and the double faced adhesive, the perimeter surface of the accessory base may be positioned close to the wall over at least a majority of the area of the perimeter surface (so that an unacceptable and/or unsightly gap is not present between the wall-facing portion of the accessory base and the wall).

Thus in one aspect, herein is disclosed a method of mounting an accessory base to a wall surface, the method comprising: providing a mounting bracket comprising a body portion comprising at least a first major surface, and at least one angled retaining flange; providing at least one sheet of double-faced adhesive with first and second oppositely-facing major adhesive surfaces; attaching the first major surface of the sheet of adhesive to the first major surface of the mounting bracket; attaching the second major surface of the sheet of adhesive to the wall surface; providing an accessory base comprising an open-ended cavity adapted to receive the mounting bracket, an interior surface located within the open-ended cavity, an engaging member movably connected to the accessory base and arranged to protrude into the open-ended cavity and to engage the angled retaining flange of the mounting bracket; positioning the accessory base such that the open-ended cavity receives the mounting bracket; and, securing the accessory base and the mounting bracket to each other, wherein the securing process comprises engaging the engaging member with the mounting bracket such that it contacts the angled retaining flange of the mounting bracket and urges the mounting bracket and the accessory base toward each other, until the engaging member is in a fully engaged position such that at least a portion of the mounting bracket contacts at least a portion of the interior surface of the accessory base so as to prevent any further movement of the mounting bracket and the accessory base toward each other, such that the mounting bracket and the accessory base are secured together; and wherein when the engaging member is in its fully engaged position, the mounting bracket is recessed within the open-ended cavity of the accessory base.

In another aspect, herein is disclosed an assembly mountable to a wall surface, comprising: a mounting bracket comprising, a body portion comprising at least a first major surface, and at least one angled retaining flange; a sheet of double-faced adhesive adhesively bonded to the first major surface of the mounting bracket and arranged to adhesively bond the mounting bracket to a wall surface; and, an accessory base comprising, an open-ended cavity adapted to receive the mounting bracket, an interior surface located within the open-ended cavity, an engaging member movably connected to the accessory base and arranged to protrude into the open-ended cavity and to engage the angled retaining flange of the mounting bracket; wherein the engaging member is movable at least between a retracted position allowing the mounting bracket to be removed from the open-ended cavity, and a fully engaged position securing the mounting bracket and the accessory base together, and further wherein when the engaging member is in its fully engaged position, the mounting bracket is recessed within the open-ended cavity of the accessory base.

In still another aspect herein is disclosed an assembly mountable to a wall surface, comprising: a mounting bracket comprising, a body portion comprising at least a first major surface, at least one angled retaining flange; a sheet of double-faced adhesive having a thickness, the double-faced adhesive sheet being adhesively bonded to the first major surface of the mounting bracket and arranged to adhesively bond the mounting bracket to a wall surface; and, an accessory base comprising, an open-ended cavity adapted to receive the mounting bracket, an interior surface located within the open-ended cavity, a perimeter surface which at least partly bounds the open end of the cavity and wherein at least a part of the perimeter surface defines an imaginary plane extending across the open end of the cavity, an engaging member movably connected to the accessory base and arranged to protrude into the open-ended cavity and to engage the angled retaining flange of the mounting bracket; wherein the engaging member is movable at least between a retracted position allowing the mounting bracket to be removed from the open-ended cavity, and a fully engaged position securing the mounting bracket and the accessory base together, and further wherein when the engaging member is in its fully engaged position, the first major surface of the mounting bracket is located at a position that is, relative to the imaginary plane defined by the perimeter surface, recessed toward the interior surface of the accessory base a distance that is about 10% to about 90% of the thickness of the double-faced adhesive sheet.

These and other aspects of the invention will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

FIG. 6a is a magnified view of the portion of FIG. 6 indicated by circle 6a.

Like reference symbols in the various figures indicate like elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated.

DETAILED DESCRIPTION

Although terms such as "top", bottom", "upper", lower", "front" and "back", and "first" and "second" may be used in this disclosure, it should be understood that those terms are used in their relative sense only.

Figure 1:
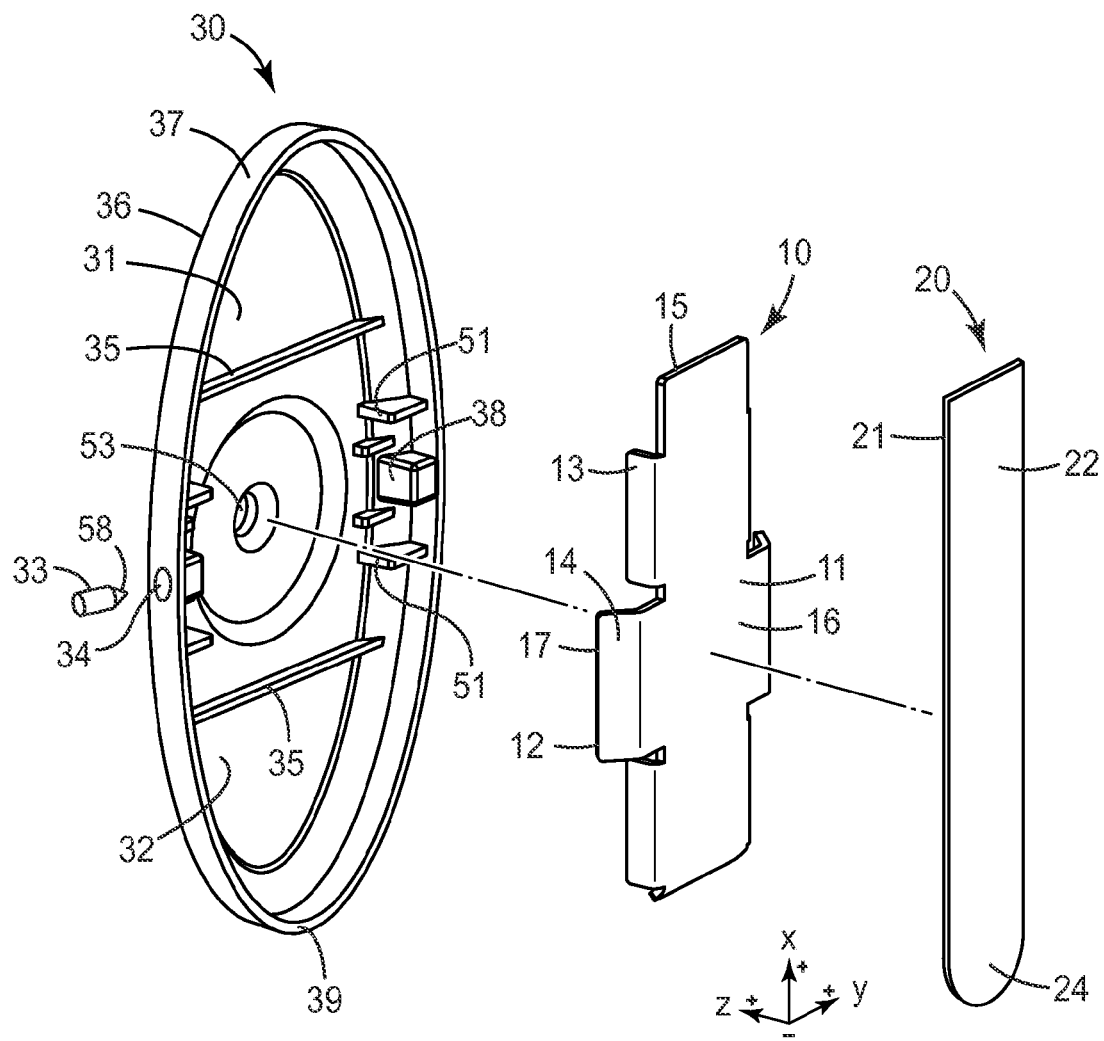
FIG. 1 is a perspective exploded view of an exemplary mounting bracket, accessory base and double-faced adhesive sheet.
Figure 2:
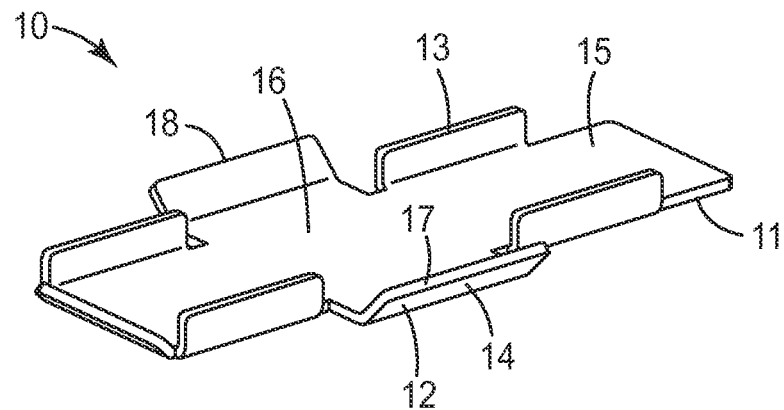
FIG. 2 is perspective view of an exemplary mounting bracket.

Herein are disclosed systems and methods for mounting items to walls or other surfaces. Such a system, when assembled, comprises a mounting assembly by which items can be securely, yet removably, mounted to a wall. With reference to FIG. 1, the system comprises mounting bracket 10, sheet 20 of double-faced adhesive, and accessory base 30. As seen in FIGS. 1 and 2, mounting bracket 10 comprises a body portion 16 that comprises a first major surface 11. First major surface 11 is relatively flat and smooth and is adapted to receive double-faced adhesive sheet 20 and to be bonded by adhesive sheet 20. In one embodiment, mounting bracket 10 comprises an elongated shape with a long axis and a short axis, as shown in FIGS. 1 and 2.

Mounting bracket 10 comprises at least one angled retaining flange 12 that protrudes from mounting bracket 10 in a direction away from first major surface 11. In one embodiment, angled retaining flange 12 is positioned so as to protrude from an edge of mounting bracket 10 (e.g., from an edge of body portion 16). In the event that mounting bracket 10 comprises a long axis and a short axis, in a particular embodiment angled retaining flange 12 is positioned along the long axis of mounting bracket 10 (e.g., as shown in the exemplary design of FIGS. 1 and 2). Angled retaining bracket 12 comprises at least first major surface 14 and terminal end 17.

In one embodiment, multiple angled retaining flanges are provided. For example, in the exemplary embodiment shown in FIG. 2, second angled retaining flange 18 is present. Again as shown in FIG. 2, in a specific embodiment additional retaining flange 18 is positioned laterally opposite angled retaining flange 12 (that is, across body portion 16 from angled retaining flange 12). Angled retaining flange 18 can be the same design (size, angle, etc.) as angled retaining flange 12, in which case the multiple angled retaining flanges of mounting bracket 10 may comprise a symmetrical configuration, e.g. as shown in FIG. 2. Such a symmetrical configuration may be advantageous in terms ease of use of the system. Or, angled retaining flange 18 can comprise a different design from flange 12.

Mounting bracket 10 is configured such that, upon securing accessory base 30 and mounting bracket 10 together, at least a portion of mounting bracket 10 contacts accessory base 30 (specifically, an interior surface 32 of accessory base 30, as explained later herein). Any part of mounting bracket 10 (for example, a terminal end 17 of angled retaining flange 12) can serve to contact interior surface 32. In a particular embodiment, one or more contact structures are provided on mounting bracket 10 for purposes of this contact. In one embodiment, the contact structure is in the form of an elongated rib or flange. (In other embodiments, such a contact structure can be in the form of one or more posts or other similar structures.) For example, in the exemplary design of FIG. 2, the contact structure comprises at least one contact flange 13 that is on an edge of body portion 16 and that protrudes from mounting bracket 10 in a direction away from major surface 11 (in the particular design of FIG. 2, multiple flanges 13 are provided). Such multiple contact structures may be advantageous in providing multiple points of contact between mounting bracket 10 and accessory base 30. Such contact structures can protrude from an edge of mounting bracket 10 (e.g., from an edge of body portion 16, as in FIG. 2); or, they can protrude from an interior portion of mounting bracket body portion 16.

Mounting bracket 10 may also comprise a second major surface 15 that faces oppositely from first major surface 11. However, while first major surface 11 is used to receive double faced adhesive 20, second major surface 15 typically does not perform such a function. Accordingly, while shown as a relatively smooth flat area in the exemplary illustration of FIG. 2, second major surface 18 need not be smooth and/or flat; e.g., it may have features (e.g., ribs, posts, flanges, etc.) protruding from it.

Mounting bracket 10 can be comprised of any suitable material, including polymeric materials, ceramic materials, and the like. In one embodiment, mounting bracket 10 is comprised of metal.

Double faced adhesive sheet 20 can comprise any suitable sheet that comprises pressure-sensitive adhesive functionality on oppositely-facing first major surface 21 and second major surface 22. Adhesive sheet 20 is configured such that first major surface 21 can be adhered to first major surface 11 of mounting bracket 10, and such that second major surface 22 can be adhered to a suitable wall surface or other surface. (It is noted that, while the term "wall" is used often throughout this disclosure, the systems, methods and assemblies disclosed herein are applicable to the mounting of items to surfaces other than those of walls, thus the term "wall" as used herein is intended to broadly encompass any item or entity to which it might be desired to mount an item.)

Adhesive sheet 20 may be supplied to a user already bonded to major surface 11 of mounting bracket 10; or sheet 20 may be supplied separately to be adhered to major surface 11 of mounting bracket 10 by the user. The double-faced adhesive can comprise any suitable adhesive that is available in the form of a sheet, tape, roll good, etc., from which a discrete adhesive sheet piece 20 can be obtained which is suitable for being contacted with and bonded to surface 11 of mounting bracket 10. Suitable adhesives thus include double-stick tapes, laminating adhesives, double-faced foam tapes, and the like, as are commonly known in the art.

In a particular embodiment, the double-faced adhesive comprises a stretch release adhesive. Such a stretch release property can allow the adhesive to be securely attached to a surface and to be later removed from the surface without visual disfigurement of, or leaving adhesive residue on, the surface.

A suitable stretch releasing adhesive tape can comprise an elastic backing, or a highly extensible and substantially inelastic backing, with a pressure-sensitive adhesive disposed (e.g. coated) thereupon. Or the tape can be formed of a solid, elastic pressure sensitive adhesive. Thus, in this context, the term "tape" encompasses products that comprise a unitary, integral, or solid construction of adhesive (in addition to products that comprise a backing with separate layers of adhesive residing thereupon). Suitable exemplary stretch releasing tapes are described in U.S. Pat. No. 4,024,312 to Korpman; German Patent No. 33 31 016; U.S. Pat. No. 5,516,581 to Kreckel et al.; and PCT International Publication No. WO 95/06691 to Bries et al. Such stretch release adhesives can range, for example, from about 0.2 mm in thickness to about 2 mm in thickness. In particular, such stretch release adhesives are often about 1 mm in thickness.

If double faced adhesive 20 is a stretch-release adhesive, it may comprise a pull tab 24 (e.g., an end of the sheet that does not comprise adhesive), and which may be grasped by a user and pulled so as to activate the stretch release properties of the adhesive.

Figure 3:
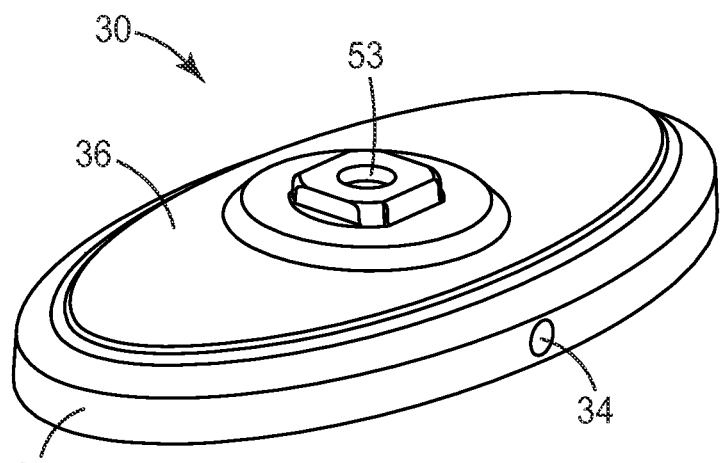
FIG. 3 is a perspective view of an exemplary accessory base.

With reference to FIG. 1, accessory base 30 is configured such that accessory base 30 can be secured to mounting bracket 10. In one embodiment, accessory base 30 is configured such that, when mounted to mounting bracket 10 (which is itself attached to a wall via double faced adhesive sheet 20), one major side of accessory base 30 faces the wall and the other major side faces away from the wall. Thus, with reference to FIGS. 1 and 3, accessory base 30 typically comprises an outer surface 36 which is visible when the base/bracket/adhesive sheet assembly is mounted to a wall. This outer surface 36 can be configured to be ornamental in appearance (e.g., polished, painted, decorated, etc.). Accessory base 30 will comprise a perimeter 37. Often, a perimeter skirt (e.g., a side wall) is provided on some or all of perimeter 37 (as depicted in FIGS. 1 and 3).

Accessory base 30 can be comprised of any suitable material, including polymeric materials, ceramic materials, and the like. In one embodiment, accessory base 30 is comprised of metal. In a specific embodiment, accessory base 30 is comprised of zinc or a zinc alloy.

Figure 5:
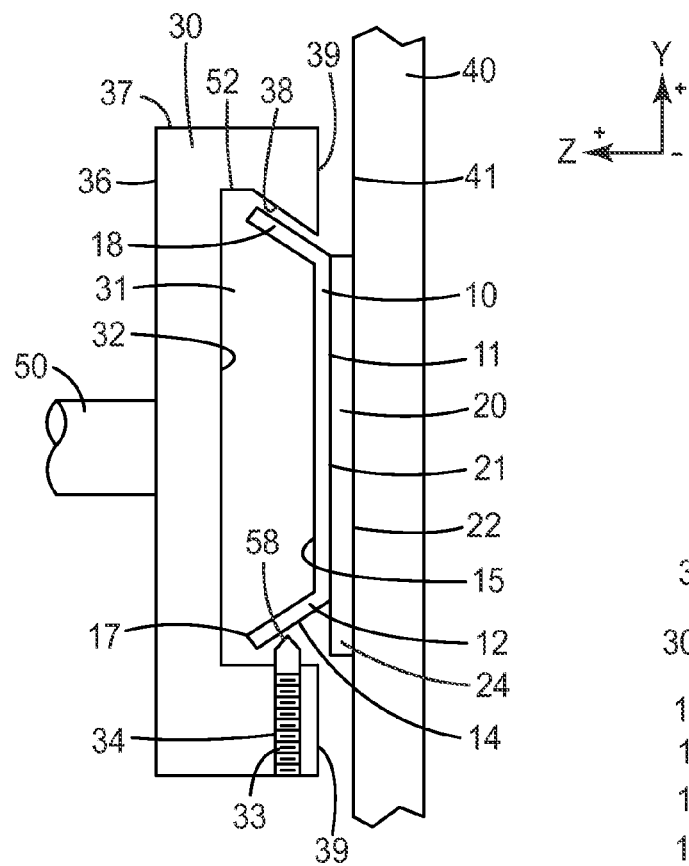
FIG. 5 is a cross sectional top view of an exemplary mounting bracket, accessory base and double-faced adhesive sheet.

Accessory base 30 can be configured to receive an accessory. Thus, in one embodiment accessory base 30 comprises one or more attachment structures by which an accessory can be attached to accessory base 30. Such an attachment structure can comprise a hole (e.g., hole 53 shown in FIGS. 1 and 3), a post (e.g., post 50 as shown in FIG. 5), or other structure (e.g., slots, pins, clamps, etc.). In an alternative embodiment, accessory base 30 has the accessory attached (e.g., permanently attached) to it or present as an integral part of accessory base 30. Accessories that might be used with the systems, methods and assemblies disclosed herein include towel racks or hangers, robe hooks, soap dishes, speaker brackets, shelves, and the like. It is also contemplated that the disclosures contained herein could be used in applications other than the attaching of items to vertical walls. For example, the methods disclosed herein might be used to attach a handle to an item that is to be carried, manipulated, etc.

As mentioned, accessory base 30 comprises an outer-facing surface 36 and a perimeter 37. On the other side of accessory base 30 (e.g. the side that will face the wall to which accessory base 30 is to be attached), open-ended cavity 31 is provided. Accessory 30 comprises interior surface 32 within cavity 31. Interior surface 32 is not visible in typical use of the assembly and so it may or may not be decorative in appearance. Perimeter surface 39, which is typically present at or near perimeter 37, will typically comprise the portion of accessory base 30 that is in closest proximity to a wall, when base 30 is mounted on the wall as described herein. The open end of cavity 31 is partly, substantially, or completely bounded by perimeter surface 39. For example, in the exemplary illustrations of FIGS. 1 and 4, perimeter surface 39 is shown as being substantially continuous around the entirety of perimeter 37 (that is, perimeter surface 39 extends completely around the open end of cavity 31). In other embodiments, however, perimeter surface 39 can be interrupted, discontinuous, broken, etc. Similarly, while in the exemplary illustrations of FIGS. 1 and 4, perimeter surface 39 is shown as substantially flat, in various embodiments perimeter surface 39 can comprise a textured, convoluted, or otherwise non-flat structure.

Figure 4:
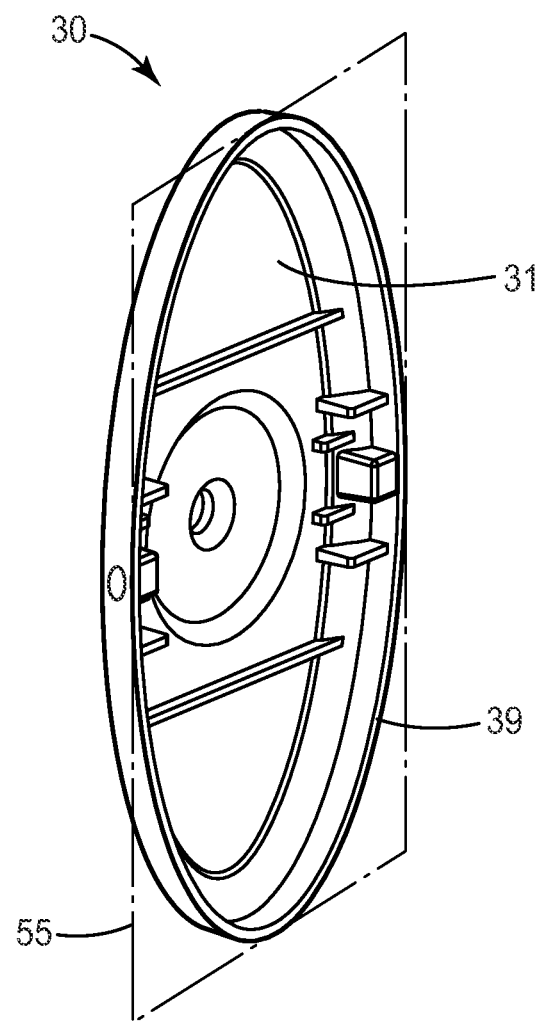
FIG. 4 is an alternate perspective view of the accessory base of FIG. 3, showing the imaginary plane defined by the perimeter surface of the accessory base.

An imaginary plane 55 can be defined with respect to perimeter surface 39, as shown in FIG. 4. Specifically, imaginary plane 55 comprises that plane which is tangent to the portions of perimeter surface 39 that, when accessory base 30 is mounted to a wall, are closest to the wall. Thus, imaginary plane 55 is defined as that plane which is tangent to the portions of perimeter surface 39 that protrude the greatest distance outwardly away from the main body of accessory 30 (that is, that extend the greatest distance in direction $z^{(-)}$ of FIG. 1). Thus, in the exemplary illustration of FIG. 4, with perimeter surface 39 being flat and continuous, imaginary plane 55 is defined by the entirety of perimeter surface 39. However, even if perimeter surface 39 is interrupted or otherwise discontinuous, and/or has a convoluted or textured surface, such an imaginary plane 55 can be defined by the portions of perimeter surface 39 that protrude the greatest distance toward the wall surface.

Accessory base 30 is configured such that cavity 31 is capable of receiving mounting bracket 10 and (in combination with the wall or surface to which mounting bracket 10 is attached) substantially concealing mounting bracket 10 and double-faced adhesive sheet 20. That is, mounting bracket 10 is configured so as to be able to fit partially, substantially or completely inside cavity 31. Thus in one embodiment, when the engaging member is in its fully engaged position (i.e., when mounting bracket 10 and accessory base 30 are secured together), mounting bracket 10 is recessed within cavity 31. In this context, recessed within cavity 31 means that all portions of mounting bracket 10, including major surface 11, are located inwardly (that is, toward interior surface 32 of cavity 31) relative to imaginary plane 55 defined by perimeter surface 39 of accessory base 30.

With respect to FIG. 1, accessory base 30 comprises an engaging member 33 which is configured to protrude at least some distance into cavity 31 and to engage angled retaining flange 12 of mounting bracket 10 in a manner described in detail herein. In one embodiment, engaging member 33 is movably connected to accessory base 30 (e.g., to perimeter 37 of accessory base 30) in such a manner that at least some portion of engaging member 33 is movable into and out of cavity 31. Specifically, engaging member 33 is movable at least between a retracted position allowing mounting bracket 10 to be separated from accessory base 30 and/or removed from accessory base cavity 31, and a fully engaged position securing the mounting bracket and the accessory base together. Engaging member 33 may also be movable into positions intermediate between the retracted position and the fully engaged position.

In a particular embodiment (shown in FIG. 1), engaging member 33 comprises a screw which occupies threaded bore 34 in perimeter 37 of accessory base 30 and which can protrude at least some distance into cavity 31. Screw 33 can be moved farther into cavity 31, and retracted therefrom, by suitable rotation of screw 33. In typical use, terminal end 58 of screw 33 will contact angled retaining flange 12 of mounting bracket 10. Terminal end 58 of screw 33 can be relatively blunt or flat, or tapered or pointed. Other engaging members can also be used, such as spring-loaded pistons and the like. In a particular embodiment, engaging member 33 is comprised of metal.

In one embodiment, accessory base 30 comprises one or more retaining means. For example, within cavity 31 may be provided one or more abutment retainers. For example, the exemplary embodiment of FIG. 5 depicts an accessory base 30 comprising an abutment wall 52 which may serve as an abutment retainer. In a particular embodiment, within cavity 31 may be provided one or more undercut retainers 38 (as, for example, depicted in accessory base 30 of FIG. 5). Such abutment and/or undercut retainers, particularly if positioned opposite to engaging member 33 (that is, substantially across cavity 31 in a direction along the direction of motion of engaging member 33) can, upon the engaging of engaging member 33 with angled flange 12 of mounting bracket 10 to a sufficient extent (as described in detail later herein), can help hold mounting bracket 10 and accessory base 30 securely together. An undercut retainer 38 can be particularly useful in the event that mounting bracket 10 comprises an angled retaining flange 18.

Figure 6:
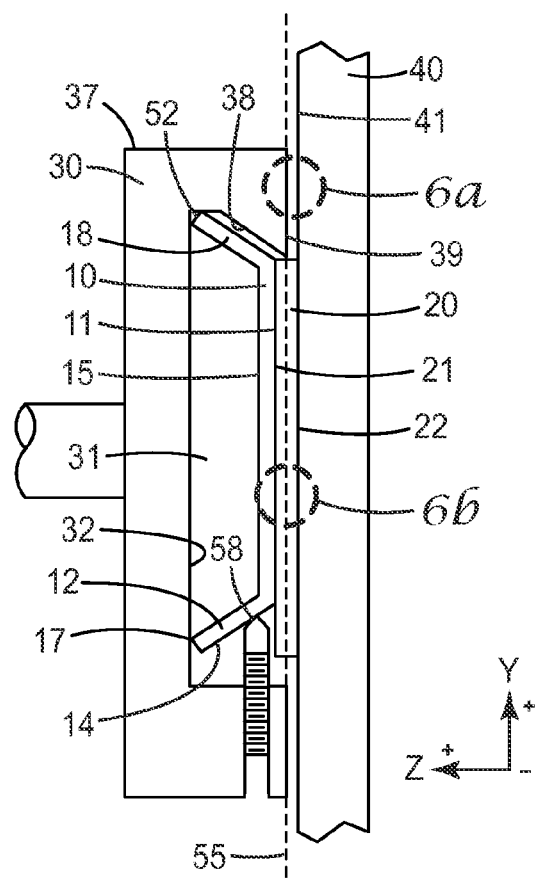
FIG. 6 is a cross sectional top view of an exemplary mounting bracket, accessory base and double-faced adhesive sheet, with the accessory base and the mounting bracket secured together.
Figure 7:
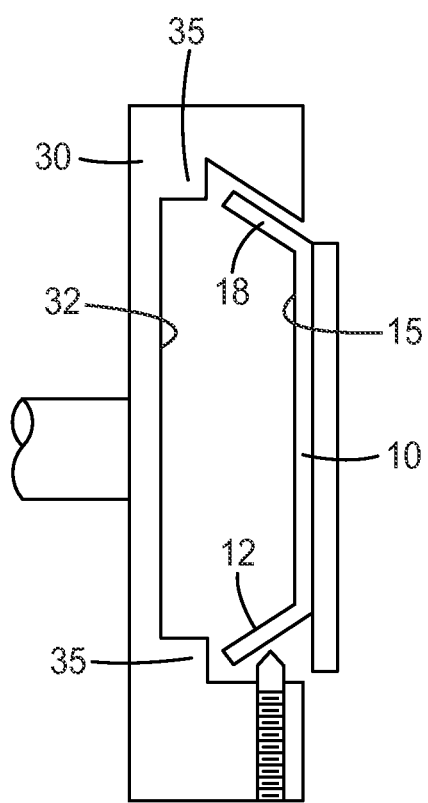
FIG. 7 is a cross sectional top view of another exemplary mounting bracket, accessory base and double-faced adhesive sheet.
Figure 8:
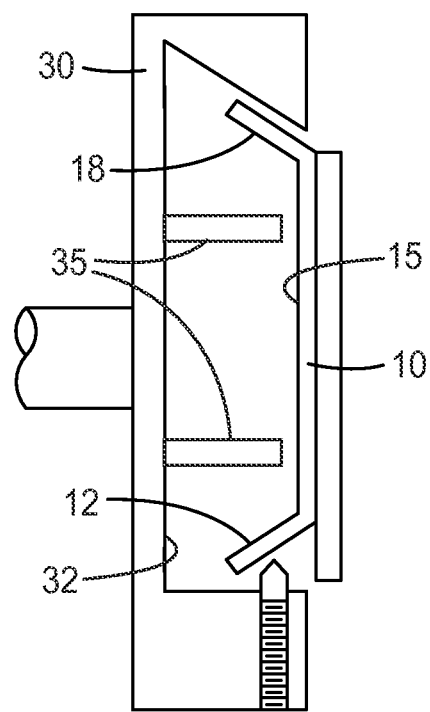
FIG. 8 is a cross sectional top view of another exemplary mounting bracket, accessory base and double-faced adhesive sheet.
Figure 9:
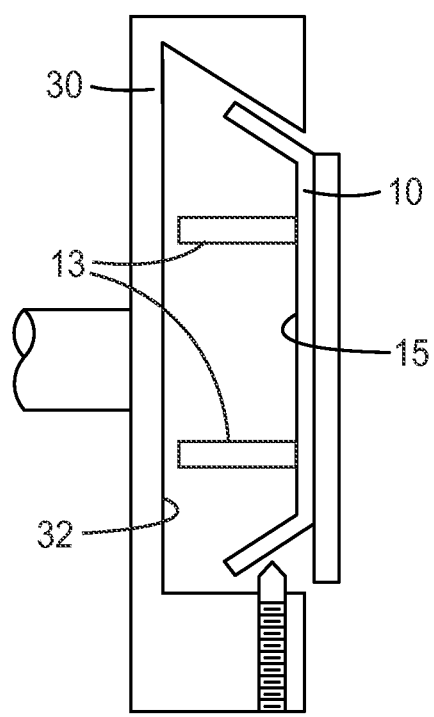
FIG. 9 is a cross sectional top view of another exemplary mounting bracket, accessory base and double-faced adhesive sheet.
Figure 10:
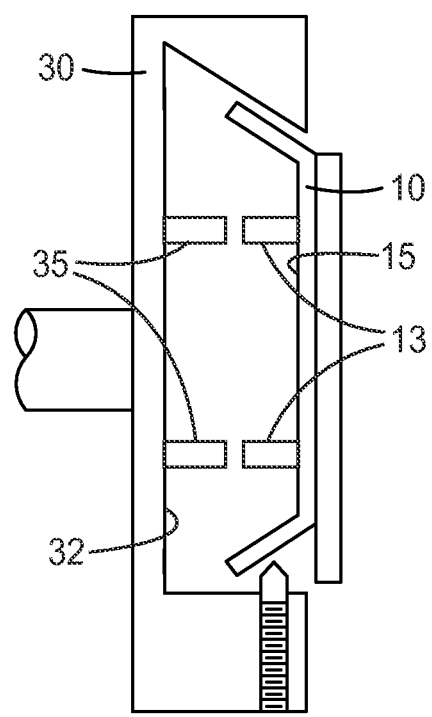
FIG. 10 is a cross sectional top view of another exemplary mounting bracket, accessory base and double-faced adhesive sheet.

As mentioned previously, mounting bracket 10 and accessory base 30 are configured such that, upon securing accessory base 30 to mounting bracket 10, at least a portion of mounting bracket 10 will contact accessory base 30 (specifically, interior surface 32 within accessory base cavity 31). Mention has also been made that mounting bracket 10 can comprise one or more contact structures (e.g., a flange, rib, post, etc.) that can serve to contact surface 32 of cavity 31. In an alternate embodiment, one or more contact structures can be provided on accessory 30 to contact some portion of mounting bracket 10. Such contact structures can be described with reference to FIGS. 5 and 6, which depict an exemplary accessory base 30 in which no specific contact structures are provided. In this case, contact would occur (upon sufficient engagement of screw 33 with angled flange 12 so as to move accessory base 30 and mounting bracket 10 closer to each other along axis z of FIG. 5) between terminal end 17 of angled retaining flanges 12 and/or 18, and some portion of inner surface 32 within cavity 31. Such contact is illustrated in FIG. 6. Alternatively, specific contact structures (e.g., structures that protrude outwardly relative to adjacent areas of surface 32) may be provided on accessory base 30. For example, in the exemplary design of FIG. 7, contact structures 35 are provided such that terminal ends 17 of angled retaining flanges 12 and/or 18 will contact the surface of contact structures 35 upon sufficient engaging of screw 33 with angled retaining flange 12. In the exemplary design of FIG. 8, contact structures 35 are provided that will contact some portion of surface 15 of body portion 16 of mounting bracket 10. In FIG. 9 is shown a configuration already described, in which contact structures 13 are provided on mounting bracket 10, that will contact some portion of interior surface 32 of accessory base 31. And finally, in the exemplary design of FIG. 10, contact structures 13 are present on mounting bracket 10 and contact structures 35 are present on accessory base 30. In this design, contact will occur between structures 35 and structures 13. An exemplary implementation of this approach is depicted in FIG. 1. In FIG. 1, multiple contact flanges 13 are present along portions of edges of mounting bracket 10, and multiple contact ribs 35 are present on accessory 30. In one embodiment, contact ribs 35 are oriented at an angle (e.g., at least at a 45 degree angle) to contact flanges 13. In a specific embodiment, contact ribs 35 are oriented transversely to contact flanges 13. Many other configurations are possible by which contact features may be provided on mounting bracket 10 and/or accessory base 30.

As mentioned, such contact structures can comprise ribs, ridges, posts, and the like, and can be linear, arcuate, broken, interrupted, and the like.

Accessory base 30 can be any suitable shape (e.g. round, square, hexagonal, etc.) In one embodiment, accessory base 30 comprises an elongated shape (e.g., as shown in FIG. 1) with a long axis and a short axis. In such a case accessory base 30 can be rectangular, oval, diamond-shaped, etc. Similarly, mounting bracket 10 can comprise a shape which is not substantially elongated; or, it can comprise an elongated shape (e.g., as depicted in FIGS. 1 and 2). For reasons that are described in detail later herein, it may be advantageous for accessory base 30 and/or mounting bracket 10 to comprise an elongated shape.

In one step of the methods disclosed herein, mounting bracket 10 is attached to a surface (e.g., a wall surface) by double faced adhesive 20. (In one embodiment, this is performed before accessory base 30 is attached to mounting bracket 10. However, it is also possible to attach accessory base 30 to mounting bracket 10 and thereafter attach mounting bracket 10 to a surface.) If adhesive 20 comprises a stretch releasing adhesive comprising a pull tab 24, adhesive sheet 20 may be mounted to surface 11 of mounting bracket 10 such that pull tab 24 extends beyond a terminal edge of mounting bracket 10 (e.g., as shown in FIG. 1), such that pull tab 24 can be grasped by a user.

In another step of the methods disclosed herein, accessory base 30 is brought into proximity to mounting bracket 10 (with major surface 16 of mounting bracket 10 facing away from accessory base 10), and mounting bracket 10 is received into cavity 31 of accessory base 30, such that engaging member 33 can be engaged with angled retaining flange 12 so as to secure accessory base 30 and mounting bracket 10 together. In the receiving of bracket 10 into cavity 31, it is useful if bracket 10 and cavity 31 are configured (e.g., sized and shaped) such that it is easy to fit bracket 10 into cavity 31. It is also useful to configure bracket 10 and cavity 31 so as to minimize the chance of bracket 10 being inserted in an incorrect position (e.g., a position in which it is difficult, or not possible, to engage engaging member 33 with flange 12). This is made easier for example if both accessory base 30 and bracket 10 have a long axis and a short axis, such that the long axes of both components are substantially aligned when the components are in the position in which they are to be brought together (such a configuration is shown in FIG. 1). Correct insertion of mounting bracket 10 into cavity 31 is also made easier if mounting bracket 10 is configured such that flange 18 is identical to flange 12, such that engaging member 33 can engage equally well with either flange.

Alignment features can be included within cavity 31 of accessory base 30, that may assist the user in accurately positioning bracket 10 with respect to the long axis of accessory base 30. For example, in FIG. 1 are shown alignment guides 51, which are positioned and spaced such that retaining flange 12 fits between one set of guides, and retaining flange 18 fits between another set of guides, to achieve proper positioning. Other such alignment systems and features may be used; for example, post and hole systems and the like.

The positioning of accessory base 30 and mounting bracket 10 such that mounting bracket 10 is properly positioned within cavity 31, such that the two items are ready to be secured together, results in a configuration similar to that shown in FIG. 5. With respect to FIGS. 5 and 6, the act of securing accessory base 30 and mounting bracket 10 together involves operating engaging member 33 so as to cause it to protrude farther into cavity 31 and to engage with angled retaining flange 12. In one embodiment, engaging member 33 comprises a screw that is positioned in threaded bore 34 of perimeter 37 of accessory base 30, and the operating thereof comprises rotating screw 33 so as to cause it to protrude further into cavity 31 so as to cause terminal end 58 of screw 33 to contact surface 14 of angled retaining flange 12. Rotating of screw 33 results in pressure being applied to surface 14, thus moving accessory base 30 and bracket 10 relative to each other, along the z axis of FIG. 5. Rotating of screw 33 may also cause accessory base 30 and bracket 10 to move relative to each other, along the y axis of FIG. 5.

With reference to FIGS. 5 and 6, sufficient engaging of engaging member 33 with flange 12 may result in some portion of bracket 10 contacting some portion of accessory base 30 by bracket 10 having moved in the $z^{(+)}$ direction relative to accessory base 30. Such contact may result from any of the various means of contact, and specific contact features, discussed previously herein and illustrated in FIGS. 6-10. Sufficient engaging of engaging member 33 with flange 12 may also result in some portion of bracket 10 contacting some portion of accessory base 30 by bracket 10 having moved in the $y^{(+)}$ direction relative to accessory base 30. Such contact may result from, for example, flange 18 contacting abutment retainer 52 and/or undercut retainer 38 (if such features are present on accessory 30).

In various embodiments, herein are disclosed configurations of bracket 10 and accessory base 30 which ensure that contact between mounting bracket 10 and accessory base 30 occurs in a manner such that the final (secured) position of mounting bracket 10 within cavity 31 is uniquely defined. Specifically, with reference to FIG. 6, mounting bracket 10 and accessory base 30 are configured such that, when bracket 10 and accessory base 30 are secured together (by sufficient engaging of engaging member 33 with angled retaining flange 12), first major surface 11 of bracket 10 is located at a defined position with respect to imaginary plane 55.

Figure 6A:
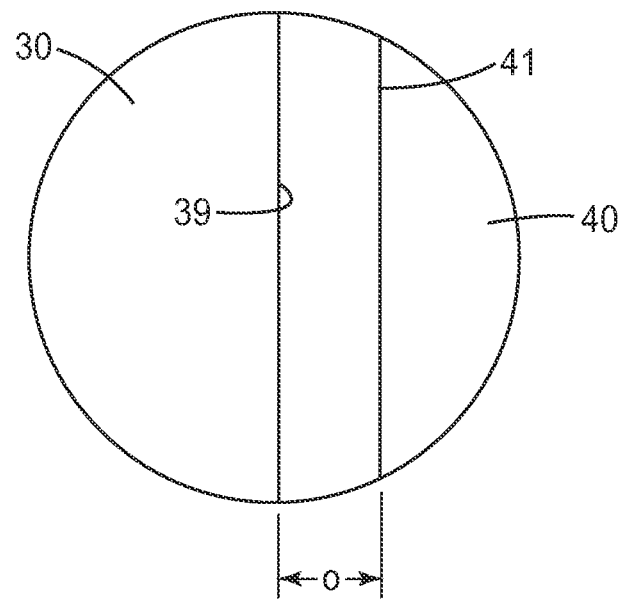
Figure 6B:
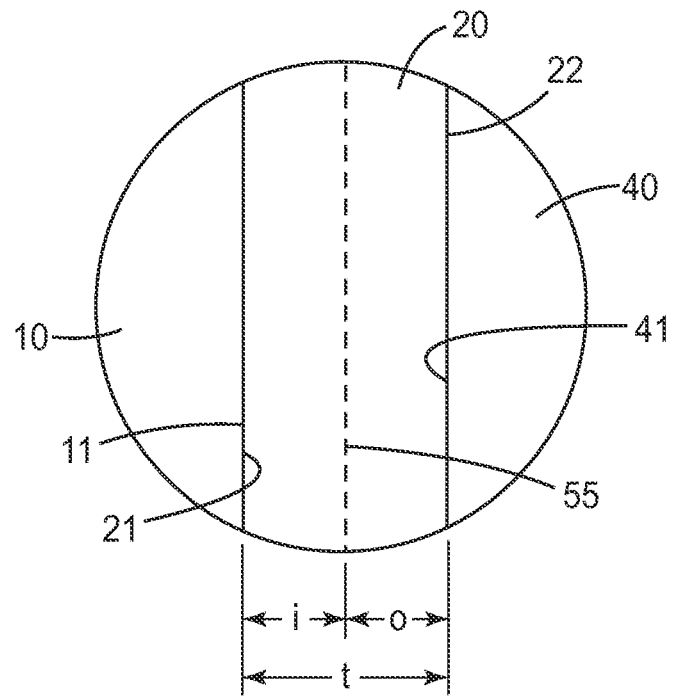
FIG. 6b is a magnified view of the portion of FIG. 6 indicated by circle 6b.

This positioning can offer several advantageous effects. This is a consequence of the fact that (as can be ascertained from FIG. 6, and the magnified views of FIGS. 6a and 6b), the z-axis distance "o" between perimeter surface 39 (or, more specifically, the outwardmost portion thereof, in direction $z^{(-)}$) and wall surface 41, will be determined by, and typically will be the same as, the distance that second major surface 22 of double-faced adhesive sheet 20 is positioned outwardly (in direction $z^{(-)}$) beyond imaginary plane 55. And, the distance that second major surface 22 is positioned beyond imaginary plane 55 depends on two things: the thickness "t" of adhesive sheet 20, and the position of first major surface 11 of bracket 10 along the z axis, relative to imaginary plane 55. Thus, using the systems and methods disclosed herein, the positioning of mounting bracket 10, and the thickness of adhesive sheet 20, can be chosen in combination for several advantageous effects and/or to minimize or eliminate several problems.

For instance, upon using a double-faced adhesive 20 to mount the bracket/base assembly to wall 40, if surface 11 were to be positioned too far outward (that is, in the $z^{(-)}$ direction in FIG. 6) beyond imaginary plane 55, a visually obvious gap might be present between the perimeter surface 39 and wall 40. For example, if the components of the system were configured such that surface 11 of bracket 10 was positioned 1 mm outward with respect to imaginary plane 55, and a double-faced adhesive of 1 mm in thickness was used, a gap of about 2 mm would be present between perimeter surface 39 of accessory base 30 and wall surface 41. Such a gap might be visible enough to be unacceptable in many applications.

In fact, the inventor has found that in many applications, a gap between perimeter surface 39 and wall surface 41, may need to be, e.g., about 1.0 mm or less, in order to be visually acceptable. The inventor has also found that such relatively large gaps can have an additional disadvantage particular to the case of using double-faced adhesive to attaching such bracket/base assemblies to a wall. Specifically, such a large gap might be disadvantageous in the event that accessory 30 bears a relatively large load (e.g., if accessory 30 comprises a towel rack that holds a large wet towel, a speaker mount that holds a heavy speaker, etc.). That is, the presence of a relatively large gap between perimeter surface 39 and wall surface 41 may allow the base/bracket assembly to at least slightly rotate, due to the fact that a double-faced adhesive is typically somewhat soft and viscoelastic (in comparison to relatively rigid materials such as metal or plastic e.g., that accessory base 30 and/or mounting bracket 10 are typically made from). The tendency of the adhesive to allow such movement may allow the development of a (rotational) moment such that a large compressive force exists near one end of adhesive sheet 20, and a tensile (peel) force exists near the other end. The presence of a compressive force may not be an issue, since such adhesives may be quite strong in compression. However, some pressure-sensitive adhesives can be low in resistance to tensile force in comparison to resistance to compressive force and/or shear force; thus, local adhesive failure might occur at the tensile-loaded location which might result in large-scale failure of the entire adhesive sheet.

Thus, in order to provide for a relatively small gap between perimeter surface 39 of accessory base 30 and surface 41 of wall 40 (whether for cosmetic purposes or to minimize any rotational moment that might be placed upon adhesive sheet 20 in the event of a significant load being present on the accessory), in one embodiment mounting bracket 10 is positioned such that first major surface 11 is located at a position that is recessed (e.g., that is toward surface 32 of accessory base 30) a distance "i" relative to imaginary plane 55. In various embodiments, first major surface 11 may be located at a position that is recessed at least 0.1 mm, or at least 0.3 mm, relative to imaginary plane 55. In further embodiments, first major surface 11 may be located at a position that is recessed about 0.5 mm, or about 1.0 mm, relative to imaginary plane 55.

Such a configuration as described above may result in perimeter surface 39 being quite close (e.g., within about 1.0 mm or less, or within about 0.5 mm or less) to surface 41 of wall 40. This may provide that, in the event of a significant load being present on accessory 30, at least a portion of perimeter surface 39 may contact wall 40, which might help minimize any rotational moment that might develop on adhesive sheet 20. (In a specific embodiment, a wall-contacting feature may be provided on a portion of accessory base 30, that is configured to contact wall 40 so as to perform this function). In essence, such a small gap between perimeter surface 39 and surface 41 of wall 40 (or between a wall-contacting feature of accessory base 30, and surface 41 of wall 40), may maximize the tendency for any load placed upon accessory 30 to be transmitted to double-faced adhesive sheet 20 at least in part as a shear force (which such adhesives may be more capable of resisting) rather than a peel or tensile force.

However, the inventor has also discovered that it may be disadvantageous to configure the system such that surface 11 is positioned too far inward (that is, toward surface 32 of accessory base 30) of imaginary plane 55. If this happens, perimeter surface 39 may contact surface 41 of wall 40 during the engaging of engaging member 33 with flange 12, with the result that continued engaging of member 33 (which would attempt to move bracket 10 in direction $z^{(+)}$ relative to wall surface 41) would result in a tensile force being developed (along the z axis) within adhesive sheet 20, which might result in failure of the adhesive. To avoid this, the inventor has found that bracket 10 and accessory base 30 can be configured so as to limit the distance that surface 11 of bracket 10 can be positioned inwards (toward surface 32 within cavity 31) relative to imaginary plane 55. Such limitations placed on the distance that surface 11 of bracket can be positioned inwards from imaginary plane 55, can also advantageously provide that a gap of at least a certain minimum distance is present between surface 39 of accessory base 30, and surface 41 of wall 40, when bracket 10 and base 10 are secured to each other. In certain embodiments, such a provision can help to minimize or avoid damage to wall surface 41. Thus in various embodiments, surface 11 of bracket 10 is not positioned more than about 1.5 mm inwards, or more than about 1 mm inwards, from imaginary plane 55 when bracket 10 and accessory base 30 are in a secured configuration.

Within the overall guidelines presented herein, the thickness of the particular double-faced adhesive sheet which is used in the systems and methods disclosed herein, may be taken into account in the determining of suitable limits on the positioning of bracket surface 11 relative to imaginary plane 55. Thus, the components described above may be generally configured such that surface 11 is positioned within distance "i" inwards of imaginary plane 55, and adhesive sheet 20 of a thickness "t" may be provided such that when bracket 10 and accessory base 30 are secured together and adhesive sheet 20 is present on surface 11 of bracket 10, the wall-facing surface 22 of sheet 20 is positioned between a position which is even with imaginary plane 55 and a position which is a distance "o" outwards beyond imaginary plane 55 (as shown in FIG. 6). In various embodiments, distance "o" is less than about 1.5 mm, less than about 1 mm, or less than about 0.5 mm. In one embodiment, bracket 10 is positioned such that surface 11 of bracket 10 is positioned a distance inward of plane 55 which is about equal to, or less than, the thickness "t" of double faced adhesive sheet 20. In a further embodiment, bracket 10 is positioned such that surface 11 of bracket 10 is positioned a distance inward of plane 55 which is from about 10% to about 90% of the thickness "t" of double faced adhesive sheet 20. In a specific embodiment, bracket 10 is positioned such that surface 11 of bracket 10 is positioned a distance inward of plane 55 which is equal to about half the thickness "t" of the double faced adhesive sheet used.

Thus in a one example, an adhesive sheet 20 of 1.0 mm thickness is used, and the system is configured such that surface 11 is positioned about 0.5 mm inward of imaginary plane 55, such that wall-facing surface 22 of sheet 20 is positioned about 0.5 mm outwards of imaginary plane 55, with the result that a gap of about 0.5 mm would be present between perimeter surface 39 of accessory base 30 and surface 41 of wall 40.

In another example, an adhesive sheet 20 of 0.4 mm thickness is used, and the system is configured such that surface 11 is positioned about 0.2 mm inward of imaginary plane 55, such that wall-facing surface 22 of sheet 20 is positioned about 0.2 mm outwards of imaginary plane 55, with the result that a gap of about 0.2 mm would be present between perimeter surface 39 of accessory base 30 and surface 41 of wall 40.

In still another example, an adhesive sheet 20 of 1.6 mm thickness is used, and the system is configured such that surface 11 is positioned about 0.8 mm inward of imaginary plane 55, such that wall-facing surface 22 of sheet 20 is positioned about 0.8 mm outwards of imaginary plane 55, with the result that a gap of about 0.8 mm would be present between perimeter surface 39 of accessory base 30 and surface 41 of wall 40.

Thus in summary, according to the disclosures herein, means are provided by which, when bracket 10 and accessory 30 are in a secured position, major surface 11 of bracket 10 is positioned as described above. Such means can comprise any suitable structures as long as the overall goals described above, are achieved. Thus, contacting means may be used such that when a part of bracket 10 and a part of accessory base 30 come into contact, the proper positioning is achieved. The various contact features on either or both of mounting bracket 10 and accessory base 30, as described earlier in detail herein and illustrated in FIGS. 6-10, can serve such purpose. As mentioned, various configurations are possible within this general approach. Multiple contact features can be used, so as to provide multiple contact points, if desired. If contact features such as ribs are present on both mounting bracket 10 and accessory base 30, they can be oriented orthogonally, as in FIG. 1.

In summary, mounting bracket 10, accessory base 30, and adhesive sheet 20 may be configured so that, when bracket 10 and base 30 are secured to each other and the bracket/base assembly is attached to a wall by adhesive sheet 20, an unsightly or otherwise unacceptable gap is not present between perimeter surface 39 of base 30, and surface 41 of wall 40. Moreover, in certain embodiments the assembly may be configured such that no part of perimeter surface 39 contacts wall 40; or, such that any contact that occurs is with minimal force, such that little or no damage or disfigurement of wall 40 occurs. That is, in such embodiments, when accessory base 30 is mounted to wall surface 41 for an amount of time, there may be little or no damage or disfigurement resulting from scuffing, rubbing, abrading, gouging, etc. of wall surface 41 by any part of perimeter surface 39. It should be noted that in conventional mounting of accessories to walls via screws, nails, and the like, the issue of minimizing the visual or cosmetic damage caused by any part of the accessory contacting the wall surface has typically been of little importance, in view of the gross damage necessarily resulting from use of the screw or nail. Thus, the inventor's discoveries enable the use of double-faced adhesive, which eliminates the wall damage often caused by methods of attaching mounting brackets using nails or screws, and may also allow the minimization or elimination of wall damage or disfigurement that might result from the accessory base itself contacting the wall.

In addition, the systems and methods disclosed herein offer an advantageous method of mounting a two-piece (bracket/base) assembly on a surface by use of a double-faced adhesive, in such a way as to minimize any tensile/peel force developed on the adhesive either during the securing of the bracket and base together, or in the case of a load being present on the accessory. Thus, the systems, methods and assemblies described herein may render such mounting bracket/accessory base/double-faced adhesive systems suitable for uses hitherto unexplored.

In an embodiment discussed earlier, accessory base 30 and bracket 10 each comprise an elongated shape with a long axis and a short axis. In such a case, it may be advantageous to configure the components such that engaging member 33 is positioned so as to be movable in a direction parallel to the short axis of base 30 (as shown in FIG. 1). In one embodiment, engaging member 33 is positioned approximately halfway along the long axis of base 30 (again as shown in FIG. 1). Such a configuration allows a relatively short engaging member 33 to be used. That is, were engaging member 33 to be positioned at an end of base 30 along the x axis, it might be necessary to use a very long engaging member 33 in view of the extra space needed in this location to accommodate tab 24 of adhesive sheet 20.

Another consideration is that, in the use of an elongated bracket and elongated base, with engaging member 33 positioned to engage in a direction parallel to short axis of base 30 and bracket 10, it may be advantageous to orient bracket 10 and base 30 each with its long axis aligned with any loading force that might be present on the accessory. Thus in the case that the loading force is gravity (by virtue of the weight of the accessory itself or of some item placed upon it), it might be advantageous to align the long axis of base 30 and bracket 10 vertically. That is, were engaging member 33 to contact flange 12, and/or flange 18 to contact retaining abutment 52, along the axis along which force is present, a tensile force might be developed which might lead to failure of the adhesive. Thus, a configuration as shown in FIG. 1, would be advantageous in a situation in which the loading force (e.g. gravity) acts in the $x^{(-)}$ direction. Also, of course, in general in the use of an elongated length of double faced adhesive, it is advantageous to position the adhesive length with its long axis parallel to the applied force.

A number of embodiments of the invention have been described. Nevertheless, it will be understood that various modifications may be made without departing from the invention. Accordingly, other embodiments are within the scope of the following claims.

What is claimed is:

1. A method of mounting an accessory base to a wall surface, the method comprising:
   providing a mounting bracket comprising,
      a body portion comprising at least a first major surface,
      at least one obliquely angled retaining flange;
   providing at least one sheet of double-faced adhesive with first and second oppositely-facing major adhesive surfaces;
   attaching the first major surface of the sheet of adhesive to the first major surface of the mounting bracket;
   attaching the second major surface of the sheet of adhesive to the wall surface;
   providing an accessory base comprising,
      an open-ended cavity adapted to receive the mounting bracket,
      an interior surface located within the open-ended cavity,
      an engaging member movably connected to the accessory base and arranged to protrude into the open-ended cavity and to engage the obliquely angled retaining flange of the mounting bracket;
   positioning the accessory base such that the open-ended cavity receives the mounting bracket;
   and,
   securing the accessory base and the mounting bracket to each other, wherein the securing process comprises:
      engaging the engaging member with the mounting bracket such that it contacts the obliquely angled retaining flange of the mounting bracket and urges the mounting bracket and the accessory base toward each other, until the engaging member is in a fully engaged position such that at least a portion of the mounting bracket contacts at least a portion of the interior surface of the accessory base so as to prevent any further movement of the mounting bracket and the accessory base toward each other, such that the mounting bracket and the accessory base are secured together;
   wherein when the engaging member is in its fully engaged position, the mounting bracket is recessed within the open-ended cavity of the accessory base;

and wherein the obliquely angled retaining flange protrudes from the mounting bracket in a direction away from the first major surface of the mounting bracket body portion so that the flange is positioned at an angle that is oblique to the first major surface of the mounting bracket body portion.

2. The method of claim 1 wherein the accessory base comprises a perimeter surface which at least partly bounds the open end of the cavity and wherein at least a part of the perimeter surface defines an imaginary plane extending across the open end of the cavity, and, wherein when the engaging member is in its fully engaged position, the first major surface of the mounting bracket is located at a position that is, relative to the imaginary plane defined by the perimeter surface, between 0.1 mm toward the interior surface of the accessory base and about 1.0 mm toward the interior surface of the accessory base.

3. The method of claim 2 wherein when the accessory base and the mounting bracket are secured to each other, the perimeter surface of the accessory base and the wall surface are less than about 1.0 mm apart.

4. The method of claim 1 wherein the mounting bracket comprises at least one mounting bracket contact structure that contacts a portion of the interior surface of the accessory base upon the urging of the mounting bracket and accessory base toward each other.

5. The method of claim 1 wherein the accessory base comprises at least one accessory base contact structure that contacts a portion of the mounting bracket upon the urging of the mounting bracket and accessory base toward each other.

6. The method of claim 1 wherein the mounting bracket comprises at least one mounting bracket contact structure, wherein the accessory base comprises at least one accessory base contact structure, and wherein the mounting bracket contact structure and the accessory base contact structure contact each other upon the urging of the mounting bracket and accessory base toward each other.

7. The method of claim 6 wherein the mounting bracket contact structure and the accessory base contact structure each comprise an elongated structure with a long axis, and wherein the long axis of the mounting bracket contact structure and the long axis of the accessory base contact structure, are oriented substantially transversely to each other.

8. The method of claim 1 wherein the engaging of the engaging member comprises moving the engaging member such that it protrudes further into the open-ended cavity in a direction substantially parallel to the first major surface of the mounting bracket.

9. The method of claim 1 wherein the double-faced adhesive sheet comprises a sheet of stretch release adhesive comprising at least one pull tab, and wherein when the mounting bracket and the accessory base are secured together and the mounting bracket is attached to a wall surface, the accessory base substantially conceals the mounting bracket and the at least one pull tab.

10. An assembly mountable to a wall surface, comprising:
a mounting bracket comprising,
a body portion comprising at least a first major surface, at least one obliquely angled retaining flange;
a sheet of double-faced adhesive adhesively bonded to the first major surface of the mounting bracket and arranged to adhesively bond the mounting bracket to a wall surface;
and,
an accessory base comprising,
an open-ended cavity adapted to receive the mounting bracket,
an interior surface located within the open-ended cavity,
an engaging member movably connected to the accessory base and arranged to protrude into the open-ended cavity and to engage the obliquely angled retaining flange of the mounting bracket;
wherein the engaging member is movable at least between a retracted position allowing the mounting bracket to be removed from the open-ended cavity, and a fully engaged position securing the mounting bracket and the accessory base together,
and further wherein when the engaging member is in its fully engaged position, the mounting bracket is recessed within the open-ended cavity of the accessory base;
and wherein the obliquely angled retaining flange protrudes from the mounting bracket in a direction away from the first major surface of the mounting bracket body portion so that the flange is positioned at an angle that is oblique to the first major surface of the mounting bracket body portion.

11. The assembly of claim 10 wherein the accessory base comprises a perimeter surface which at least partly bounds the open end of the cavity and wherein at least a part of the perimeter surface defines an imaginary plane extending across the open end of the cavity, and, wherein when the engaging member is in its fully engaged position, the first major surface of the mounting bracket is located at a position that is, relative to the imaginary plane defined by the perimeter surface, between 0.1 mm toward the interior surface of the accessory base and about 1.0 mm toward the interior surface of the accessory base.

12. The assembly of claim 10 wherein the mounting bracket comprises at least one mounting bracket contact structure that contacts a portion of the interior surface of the accessory base upon the moving of the engaging member to a fully engaged position.

13. The assembly of claim 10 wherein the accessory base comprises at least one accessory base contact structure that contacts a portion of the mounting bracket upon the moving of the engaging member to a fully engaged position.

14. The assembly of claim 10 wherein the mounting bracket comprises at least one mounting bracket contact structure, wherein the accessory base comprises at least one accessory base contact structure, and wherein the mounting bracket contact structure and the accessory base contact structure are configured to contact each other upon the moving of the engaging member to a fully engaged position.

15. The assembly of claim 14 wherein the mounting bracket contact structure and the accessory base contact structure each comprise an elongated structure with a long axis, and wherein the long axis of the mounting bracket contact structure and the long axis of the accessory base contact structure are oriented substantially transversely to each other.

16. The assembly of claim 10 wherein the mounting bracket has a long axis and a short axis and the accessory base has a long axis and a short axis, and wherein the mounting bracket and the accessory base are configured such that the when the open-ended cavity receives the mounting bracket, the long axes of the mounting bracket and the accessory base are substantially aligned, and wherein the engaging member is configured to protrude into the open-ended cavity in a direction substantially parallel to the short axis of the accessory base.

17. The assembly of claim 10 wherein the double-faced adhesive sheet comprises a stretch-releasing adhesive.

18. The assembly of claim 10 wherein the mounting bracket, the accessory base, and the engaging member are comprised of metal.

19. An assembly mountable to a wall surface, comprising:
a mounting bracket comprising,
   a body portion comprising at least a first major surface,
   at least one obliquely angled retaining flange;
a sheet of double-faced adhesive having a thickness, the double-faced adhesive sheet being adhesively bonded to the first major surface of the mounting bracket and arranged to adhesively bond the mounting bracket to a wall surface;
and,
an accessory base comprising,
   an open-ended cavity adapted to receive the mounting bracket,
   an interior surface located within the open-ended cavity,
   a perimeter surface which at least partly bounds the open end of the cavity and
wherein at least a part of the perimeter surface defines an imaginary plane extending across the open end of the cavity,
   an engaging member movably connected to the accessory base and arranged to protrude into the open-ended cavity and to engage the obliquely angled retaining flange of the mounting bracket;
   wherein the engaging member is movable at least between a retracted position allowing the mounting bracket to be removed from the open-ended cavity, and a fully engaged position securing the mounting bracket and the accessory base together
   and wherein the obliquely angled retaining flange protrudes from the mounting bracket in a direction away from the first major surface of the mounting bracket body portion so that the flange is positioned at an angle that is oblique to the first major surface of the mounting bracket body portion,
and further wherein when the engaging member is in its fully engaged position, the first major surface of the mounting bracket is located at a position that is, relative to the imaginary plane defined by the perimeter surface, recessed toward the interior surface of the accessory base a distance that is about 10% to about 90% of the thickness of the double-faced adhesive sheet.

20. The assembly of claim 19 wherein when the engaging member is in its fully engaged position, the first major surface of the mounting bracket is located at a position that is, relative to the imaginary plane defined by the perimeter surface, recessed toward the interior surface of the accessory base a distance that is about half the thickness of the double-faced adhesive sheet.

* * * * *

UNITED STATES PATENT AND TRADEMARK OFFICE
CERTIFICATE OF CORRECTION

| | | |
|---|---|---|
| PATENT NO. | : 8,973,878 B2 | Page 1 of 1 |
| APPLICATION NO. | : 12/056384 | |
| DATED | : March 10, 2015 | |
| INVENTOR(S) | : Craig Thompson | |

It is certified that error appears in the above-identified patent and that said Letters Patent is hereby corrected as shown below:

In the Specification

Column 7
Line 2, Delete "cavity 3 1)." and insert -- cavity 31). --, therefor.

Column 8
Line 26, Delete "cavity 3 1)." and insert -- cavity 31). --, therefor.

In the Claims

Column 18
Line 7, In Claim 19, delete "together" and insert -- together; --, therefor.

Signed and Sealed this
Twenty-second Day of September, 2015

Michelle K. Lee
*Director of the United States Patent and Trademark Office*